(12) United States Patent
Park

(10) Patent No.: US 12,545,226 B2
(45) Date of Patent: Feb. 10, 2026

(54) VEHICLE BRAKING SYSTEM AND CONTROL METHOD OF THE SAME

(71) Applicant: HL MANDO CORPORATION, Pyeongtaek-si (KR)

(72) Inventor: Jaehyun Park, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 469 days.

(21) Appl. No.: 18/112,807

(22) Filed: Feb. 22, 2023

(65) Prior Publication Data

US 2023/0264668 A1 Aug. 24, 2023

(30) Foreign Application Priority Data

Feb. 24, 2022 (KR) .................... 10-2022-0024096

(51) Int. Cl.
*B60T 17/22* (2006.01)
*B60T 8/171* (2006.01)

(52) U.S. Cl.
CPC ............ *B60T 17/221* (2013.01); *B60T 8/171* (2013.01); *B60T 2270/404* (2013.01); *B60T 2270/89* (2013.01)

(58) Field of Classification Search
CPC ......... F16D 2123/00; B60T 13/00–748; B60T 17/221; B60T 8/171; B60T 2270/404; B60T 2270/89
See application file for complete search history.

(56) References Cited

U.S. PATENT DOCUMENTS

| | | | |
|---|---|---|---|
| 2011/0153147 A1* | 6/2011 | Watanabe | F16D 65/18 188/72.4 |
| 2014/0144730 A1* | 5/2014 | Schwarz | B60T 7/042 188/72.3 |
| 2023/0145033 A1* | 5/2023 | Park | F16D 65/22 188/72.3 |

FOREIGN PATENT DOCUMENTS

| | | | | |
|---|---|---|---|---|
| FR | 2835896 A1 * | 8/2003 | ............ | F16D 69/00 |
| KR | 10-2020-0065353 A | 6/2020 | | |
| KR | 10-2020-0125196 A | 11/2020 | | |

* cited by examiner

*Primary Examiner* — David R Morris
(74) *Attorney, Agent, or Firm* — Harvest IP Law, LLP

(57) ABSTRACT

A vehicle braking system capable of normally releasing brakes under various conditions and a control method thereof is provided. The vehicle braking system includes a braking device and a brake release assisting unit, wherein the brake release assisting unit maintains a braking force at a constant level by applying auxiliary hydraulic pressure to the braking device when braking of the braking device is released.

15 Claims, 6 Drawing Sheets

VEHICLE BRAKING SYSTEM AND CONTROL METHOD OF THE SAME

CROSS-REFERENCE TO RELATED APPLICATION

This application claims priority to and the benefit of Korean Patent Application No. 10-2022-0024096, filed on Feb. 24, 2022, the disclosure of which is incorporated herein by reference in its entirety.

TECHNICAL FIELD

The present disclosure relates to a vehicle braking system and a control method thereof, and more specifically to a vehicle braking system which is capable of normally releasing brakes under various conditions, and a control method thereof.

BACKGROUND ART

The vehicle braking system refers to a system that decelerates or stops a vehicle in motion. A typical vehicle braking system permits or limits the movement of wheel cylinders by controlling braking hydraulic pressure which is transmitted to the wheel cylinders of wheels.

Conversely, in order to accelerate or maintain the speed of a vehicle being braked, the brake release of a vehicle brake system is required. In this case, the vehicle braking system releases the braking by removing the braking hydraulic pressure acting on the wheel cylinders.

Conventional vehicle braking systems receive energy from a motor to remove braking hydraulic pressure. However, this type of vehicle braking system has problems in that the energy required by the motor for brake release is rather large, and the time required for voltage drop and release during driving is also large.

In particular, when the energy required for brake release is high, such as a high engagement state between a vehicle braking system and a wheel disk, a low voltage situation and the like, the load applied to the motor side will be further increased. As a result, this results in limitations in the brake release operation of the vehicle brake system.

Therefore, the development of a vehicle braking system and a control method thereof that can release brakes normally under various adverse conditions can be considered.

DISCLOSURE

Technical Problem

An object of the present disclosure is to provide a vehicle braking system, which is capable of normally releasing braking under various conditions, and a control method thereof.

Another object of the present disclosure is to provide a vehicle braking system, which can further reduce power consumption required for brake release, and a control method thereof.

Still another object of the present disclosure is to provide a vehicle braking system, in which the brake release time can be further reduced, and a control method thereof.

Technical Solution

In order to achieve the above objects, the vehicle braking system according to an aspect of the present disclosure includes a braking device for controlling braking hydraulic pressure which is transmitted to a wheel cylinder; and a brake release assisting unit for maintaining a braking force of the braking device at a constant level when braking of the braking device is released, wherein the brake release assisting unit includes a release request receiving unit for receiving a release request signal of the braking device; and a hydraulic part for applying a preset pressure of auxiliary hydraulic pressure to the braking device when the release request receiving unit receives a release request signal.

In addition, the release request receiving unit may further include a normal release determination unit for determining whether the brake release of the braking device has been normally completed and terminating the application of auxiliary hydraulic pressure by the hydraulic part, when it is determined that the brake release is normally completed.

In addition, the normal release determination unit may determine that the brake release is normally completed, when the current of the braking device is less than a preset current, and at the same time, the load applied to the current of the braking device is less than or equal to a preset value.

In addition, the brake release assisting unit may store a state at the time of termination of an actuator provided in the braking device, when the application of auxiliary hydraulic pressure by the hydraulic part is terminated.

In addition, the vehicle braking system may further include a fault detection unit for determining whether the braking device is operating normally when braking of the braking device is released, and starting auxiliary hydraulic pressure of the hydraulic part, when it is determined that the braking device is operating normally.

In addition, the fault detection unit may transmit a fault signal to the outside, when it is determined that the braking device is operating abnormally.

In addition, the fault detection unit may output a visual signal, when a fault signal is transmitted to the outside.

In addition, the fault detection unit may output an auditory signal, when a fault signal is transmitted to the outside.

In addition, the fault detection unit may determine that the braking device is operating abnormally, when the voltage of the braking device is less than a preset voltage.

In addition, the preset voltage may be formed to be 10V.

In addition, the present disclosure provides a method for controlling a vehicle braking system, including (a) receiving a release request signal of a braking device by a brake release assisting unit; and (b) applying auxiliary hydraulic pressure to the braking device by the brake release assisting unit, wherein the brake release assisting unit maintains a braking force of the braking device at a constant level by applying a preset pressure of auxiliary hydraulic pressure to the braking device.

In addition, (b0) determining whether the braking device is operating normally by a fault detection unit may be performed after step (a) and before step (b).

In addition, step (b) may be performed, when it is determined that the braking device is operating normally in step (b0).

In addition, step (b0) may include (b0') determining, by the fault detection unit, that the braking device is operating abnormally, when the voltage of the braking device is less than a preset voltage.

In addition, (b01) transmitting a fault signal to the outside by the fault detection unit may be performed after step (b0').

In addition, step (b01) may include (b011) transmitting a fault signal to the outside through a visual signal by the fault detection unit.

In addition, step (b01) may include (b012) transmitting a fault signal to the outside through an auditory signal by the fault detection unit.

In addition, (c) determining whether the brake release of the braking device is normally completed by a normal release determination unit may be performed after step (b).

In addition, step (c) may include (c') determining, by the normal release determination unit, that the brake release is normally completed, when the current of the braking device is less than a preset current, and at the same time, the load applied to the current of the braking device is less than or equal to a preset value.

In addition, (d) stopping the driving of the brake release assisting unit and storing a state of an actuator provided in the braking device by the brake release assisting unit may be performed after step (c').

Advantageous Effects

Among various effects of the present disclosure, the effects that can be obtained through the above-described technical solution are as follows.

First, the vehicle braking system includes a brake release assisting unit that maintains the braking force of a braking device at a constant level by applying a preset pressure of auxiliary hydraulic pressure to the braking device when braking is released.

Accordingly, the brake release operation can be performed more easily in various adverse conditions, such as a high coupling state between the vehicle braking system and the wheel disk, a low voltage situation and the like. Accordingly, even in a faulty state, it can be easily restored to a normal state, and reliability of the brake release operation can also be improved.

In addition, as the brake release assist unit applies auxiliary hydraulic pressure to the braking device, the load applied to the motor side during brake release is further reduced.

Accordingly, power consumption of the motor required for brake release may be further reduced.

In addition, after receiving a brake release request signal, the brake release assisting unit determines that the brake release is normally completed and terminates the application of auxiliary hydraulic pressure, when the current of the braking device is less than a preset current, and at the same time, the load applied to the current of the braking device is less than or equal to a preset value.

Accordingly, the braking force of the braking device can be released more quickly. Therefore, the time required for voltage drop during the brake release and driving of a braking device may be further reduced. As a result, the release responsiveness and durability of a braking device can be further improved.

MODES OF THE INVENTION

Figure 1:
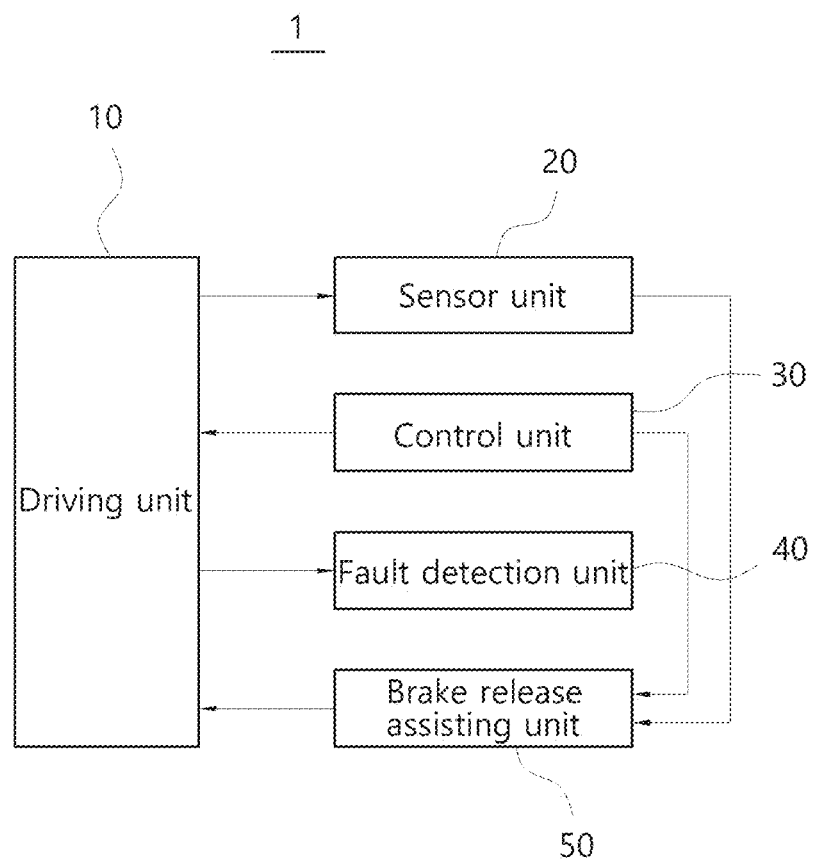
FIG. 1 is a conceptual diagram illustrating the vehicle braking system according to an exemplary embodiment of the present disclosure.

Hereinafter, the vehicle braking system 1 according to an exemplary embodiment of the present disclosure and a control method thereof will be described in detail with reference to the drawings.

In the following description, the descriptions of some components may be omitted to clarify the characteristics of the present disclosure.

In the present specification, the same reference numerals are assigned to the same components even in different exemplary embodiments, and overlapping descriptions thereof will be omitted.

The accompanying drawings are only for easy understanding of the exemplary embodiments disclosed in the present specification, and the technical ideas disclosed in the present specification are not limited by the accompanying drawings.

Singular expressions include plural expressions, unless the context clearly indicates otherwise.

Figure 2:
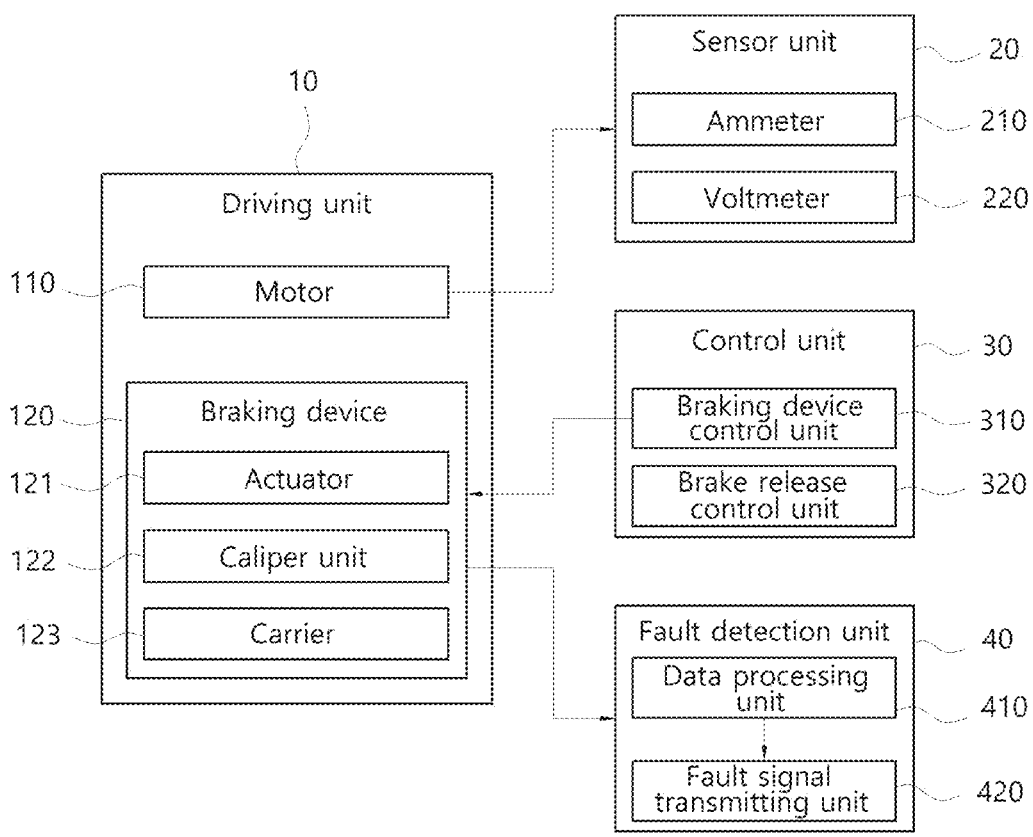
FIG. 2 is a conceptual diagram illustrating a driving unit, a sensor unit, a control unit and a fault detection unit provided in the vehicle braking system of FIG. 1.
Figure 3:
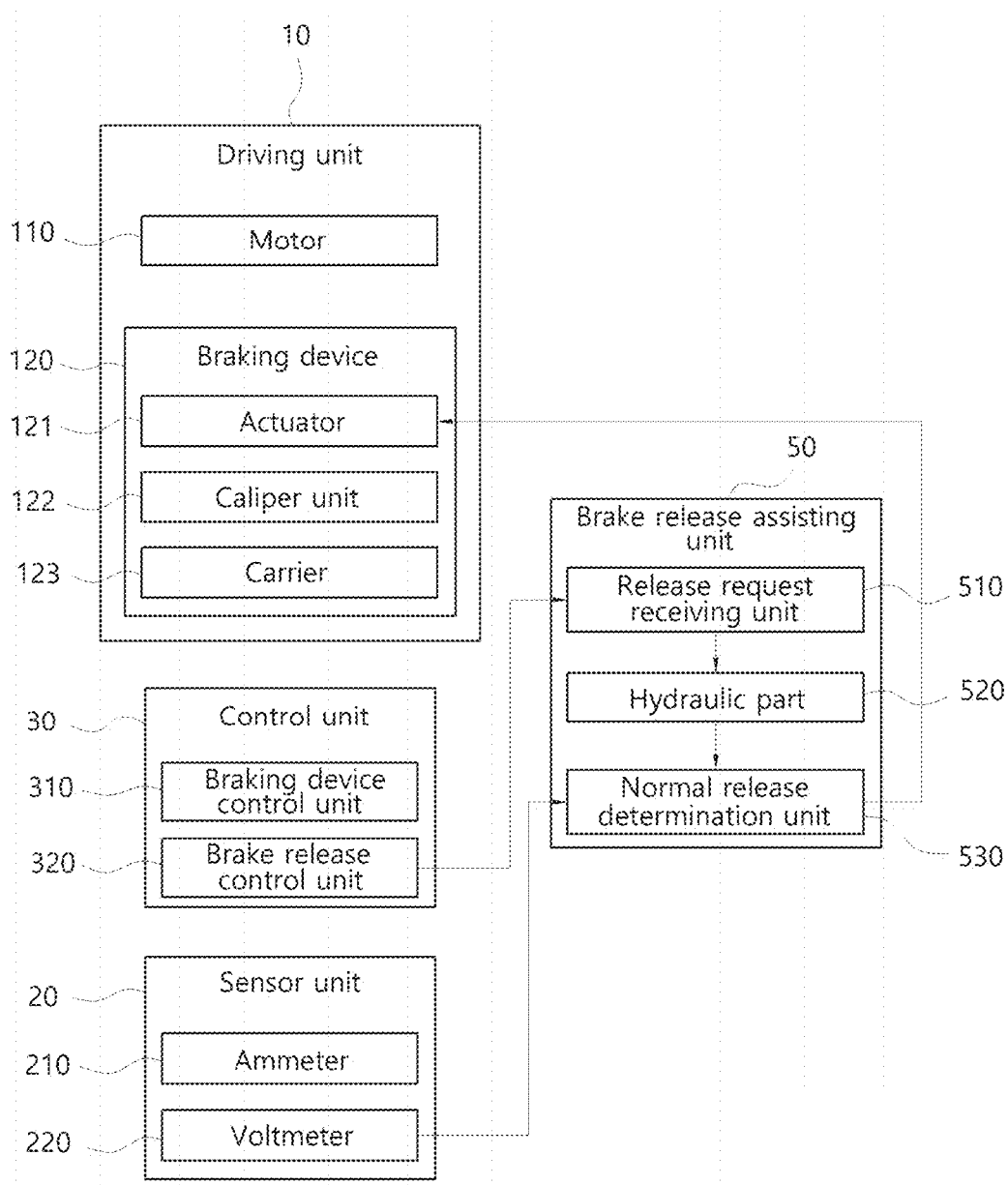
FIG. 3 is a conceptual diagram illustrating a driving unit, a sensor unit, a control unit and a brake release assisting unit provided in the vehicle braking system of FIG. 1.

Hereinafter, the vehicle braking system 1 according to an exemplary embodiment of the present disclosure will be described with reference to FIGS. 1 to 3.

The vehicle braking system 1 can slow down or brake the movement speed of a vehicle. The vehicle braking system 1 permits or limits the movement of wheel cylinders by controlling braking hydraulic pressure which is transmitted to the wheel cylinders of wheels.

Conversely, the brake release of the vehicle braking system 1 is required to accelerate or maintain the speed of a vehicle which is being braked. In this case, the vehicle braking system 1 releases the braking by removing the braking hydraulic pressure acting on the wheel cylinder.

In the illustrated exemplary embodiment, the vehicle braking system 1 includes a driving unit 10, a sensor unit 20, a control unit 30, a fault detection unit 40 and a brake release assisting unit 50.

The driving unit 10 includes a motor 110 for transmitting power to the vehicle and a braking device 120 for limiting the rotational motion of a wheel disk connected to a wheel.

The braking device 120 is a part that directly controls braking hydraulic pressure transmitted to wheel cylinders. In the illustrated exemplary embodiment, the braking device 120 includes an actuator 121, a caliper unit 122 and a carrier 123.

The actuator 121 converts electrical energy into mechanical energy to move a caliper unit 122 to be described below. The mechanical energy generated by the actuator 121 may then be transmitted to the cylinder and piston of the caliper unit 122.

The caliper unit 122 presses a carrier 123 to be described below to bring the friction pad and the wheel disk into close contact. The caliper unit 122 receives mechanical energy from the actuator 121 and presses the carrier 123 based thereon.

A cylinder and piston provided in the caliper unit 122 may be moved in a direction toward or away from the wheel disk. When the cylinder and the piston are moved in a direction toward the wheel disk, the carrier 123 may come into close contact with the wheel disk. Conversely, when the cylinder and piston are moved away from the disk, the carrier 123 separates from the wheel disk.

The carrier 123 is a part that directly stops the rotation of a wheel disk.

The carrier 123 is arranged to enclose a portion of the wheel disk. At the same time, the carrier 123 is arranged such that a portion thereof is wrapped by the caliper unit 122. That is, the carrier 123 is disposed to overlap the caliper unit 122 and the wheel disk in the axial direction of the wheel disk.

When the friction pad provided on the carrier 123 contacts the wheel disk, the rotation of the wheel disk is limited by frictional force. As a result, the rotation of the wheel disk is stopped such that the vehicle may be braked. During the braking process, a pair of friction pads are disposed with the wheel disk interposed therebetween, and each thereof moves in a direction toward the wheel disk.

The sensor unit 20 measures the current state of the braking device 120. To this end, the sensor unit 20 is electrically connected to the braking device 120. In the illustrated exemplary embodiment, the sensor unit 20 includes an ammeter 210 for measuring the current of the braking device 120 and a voltmeter 220 for measuring the voltage.

The control unit 30 controls a braking operation and a brake release operation of the vehicle braking system 1.

In the illustrated exemplary embodiment, the control unit 30 includes a braking device control unit 310 and a brake release control unit 320.

The braking device control unit 310 is electrically connected to the braking device 120 and controls starting, stopping and braking force of the braking device 120. The brake release control unit 320 controls a brake release assisting unit 50 to be described below. The detailed description thereof will be provided below.

The fault detection unit 40 determines whether the braking device 120 is operating normally, and outputs the result to the outside. To this end, the fault detection unit 40 is electrically connected to the braking device 120.

The fault detection unit 40 determines whether the braking device 120 is operating normally when braking of the braking device 120 is released. When it is determined that the braking device 120 is operating normally, the brake release operation continues. Conversely, when it is determined that the braking device 120 is operating abnormally, a fault signal is sent to the outside.

In the illustrated exemplary embodiment, the fault detection unit 40 includes a data processing unit 410 and a fault signal transmitting unit 420.

The data processing unit 410 receives information from the braking device 120 and determines whether the braking device 120 is operating normally based thereon.

In an exemplary embodiment, when the voltage of the braking device 120 is less than 10V, the data processing unit 410 may determine that the braking device 120 is operating abnormally.

When it is determined that the braking device 120 is operating abnormally as a result of the operation of the data processor 410, the operation result is transmitted to the fault signal transmitting unit 420.

The fault signal transmitting unit 420 transmits a fault signal to the outside when abnormal operation of the braking device 120 is detected. When the fault signal transmitting unit 420 receives the fault signal from the data processing unit 410, it outputs a fault signal to the outside based thereon.

In an exemplary embodiment, the fault signal transmitting unit 420 may transmit a fault signal to the outside by outputting at least one of a visual signal and an auditory signal.

Brake release is required to accelerate or maintain the speed of a vehicle while the brake system 120 is operating. In this case, the brake release assisting unit 50 is driven together during the brake release process of the braking device 120.

Hereinafter, the brake release assisting unit 50 will be described with reference to FIG. 3.

When the braking of the braking device 120 is released, the brake release assisting unit 50 maintains the braking force of the braking device 120 at a constant level until the brake release operation is normally completed. In an exemplary embodiment, the brake release assisting unit 50 stores a state at the time of termination of the actuator 121 provided in the braking device 120 when the brake release operation is normally completed.

In the illustrated exemplary embodiment, the brake release assisting unit 50 includes a release request receiving unit 510, a hydraulic part 520 and a normal release determining unit 530.

The release request receiving unit 510 receives the release request signal of the braking device 120 and starts the brake release assisting unit 50. In this case, the release request receiving unit 510 is electrically connected to the brake release control unit 320 and receives a release request signal from the brake release control unit 320. When the brake release assisting unit 50 is started, the hydraulic part 520 applies auxiliary hydraulic pressure to the braking device 120.

The hydraulic part 520 may constantly maintain the braking force of the braking device 120 by applying a preset pressure of auxiliary hydraulic pressure to the braking device 120.

Accordingly, the brake release operation may be performed more easily in various adverse conditions, such as a high coupling state between the vehicle braking system 1 and the wheel disk, a low voltage situation and the like. Accordingly, even in a faulty state, it may be easily restored to a normal state, and the reliability of the brake release operation may also be improved.

In addition, as the brake release assisting unit 50 applies the auxiliary hydraulic pressure to the braking device 120, the load applied to the motor 110 during brake release is further reduced. Accordingly, the power consumption of the motor 110 required for brake release may be further reduced.

When the application of the auxiliary hydraulic pressure by the hydraulic part 520 is finished, the driving of the brake release assisting unit 50 is stopped. In an exemplary embodiment, the brake release assisting unit 50 may store a state at the time of termination of the actuator 121 when the application of the auxiliary hydraulic pressure by the hydraulic part 520 is terminated.

The operation of the hydraulic part 520 is terminated when the brake release operation of the braking device 120 is normally completed.

The normal release determination unit 530 determines whether the brake release of the braking device 120 is normally completed. When the normal release determination unit 530 determines that the brake release is normally completed, the application of the auxiliary hydraulic pressure by the hydraulic part 520 is terminated.

The normal release determining unit 530 is electrically connected to the ammeter 210 and receives the current value of the braking device 120 from the ammeter 210. The normal release determination unit 530 determines whether the brake release is normally completed based thereon.

In an exemplary embodiment, the normal release determination unit 530 may determine that the brake release is normally completed, when the current of the braking device 120 is less than a preset current, and at the same time, the load applied to the current of the braking device 120 is less than or equal to a preset value.

In addition, the normal release determining unit 530 is electrically connected to the actuator 121 and may store a state of the actuator 121 when the application of the auxiliary hydraulic pressure by the hydraulic part 520 is terminated.

Figure 4:
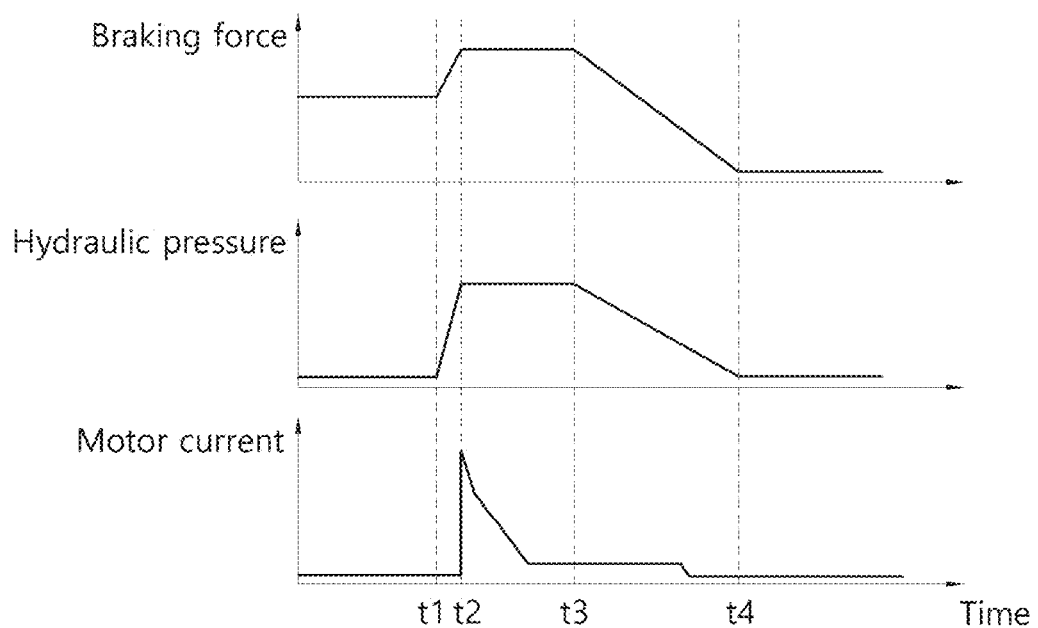
FIGS. 4 to 5 are schematic diagrams illustrating changes in the braking force, hydraulic pressure and motor current when braking is released in the vehicle braking system of FIG. 1.

In the above, the components of the vehicle braking system 1 have been described. Hereinafter, the brake release process of the vehicle braking system 1 will be described with reference to FIG. 4.

Herein, it is assumed that the vehicle is in a normal braking state when T (time)=0. As the vehicle is braking, the braking force of the braking device 120 is applied to the wheel disk by a number greater than zero.

At T=t1, the control unit 30 transmits a brake release request signal to the braking device 120 and the brake release assist unit 50. Accordingly, the hydraulic part 520 of the brake release assist unit 50 starts to apply auxiliary hydraulic pressure to the braking device 120, and the braking force of the control device starts to increase together.

At T=t2, the auxiliary hydraulic pressure applied to the braking device 120 reaches a preset pressure. The hydraulic part 520 maintains a braking force of the braking device 120 at a constant level by applying auxiliary hydraulic pressure at a preset pressure.

In this process, the current and power consumption of the motor 110 required for brake release may be further reduced.

At T=t3, the normal release determination unit 530 determines that the brake release of the braking device 120 is normally completed. Accordingly, the application of the auxiliary hydraulic pressure by the hydraulic part 520 is terminated, and both of the hydraulic pressure and the braking force begin to decrease.

At T=t4, the hydraulic pressure and braking force are completely removed, and the vehicle returns to the state before braking.

Accordingly, the braking force of the braking device 120 may be released more quickly by the brake release assisting unit 50. Accordingly, the time required for voltage drop during brake release and driving of the braking device 120 may be further reduced. As a result, the release responsiveness and durability of the braking device 120 may be further improved.

Hereinafter, the amount of electric power of the motor 110, which is required when braking of the vehicle braking system 1 is released, will be described with reference to FIG. 5.

Figure 5:
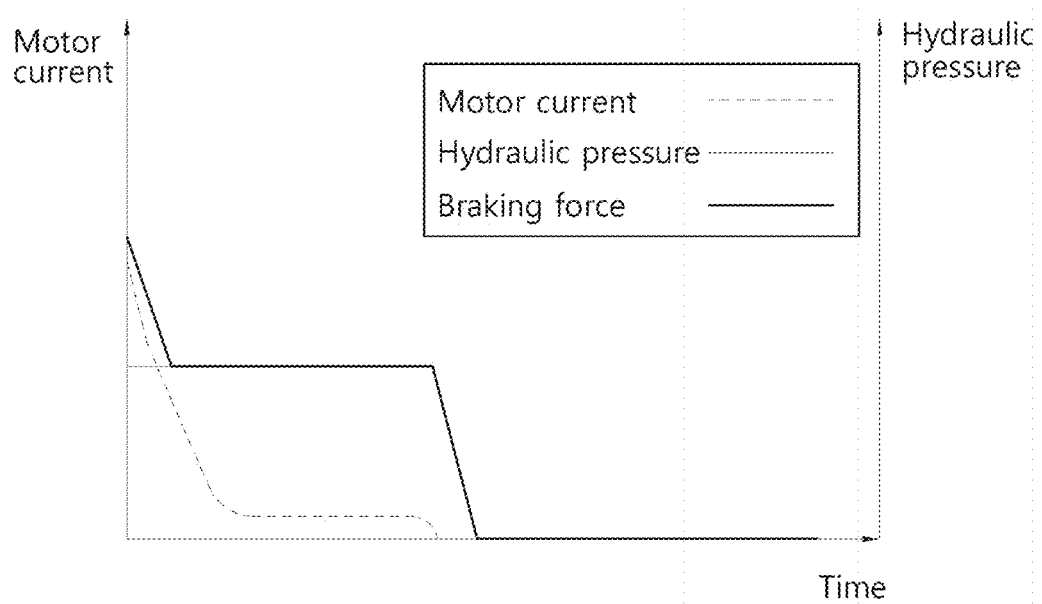

FIG. 5 illustrates changes in current, hydraulic pressure and braking force of the motor 110 in the process of removing the braking force of the braking device 120.

As described above, when the braking of the braking device 120 is released, the brake release assisting unit 50 applies auxiliary hydraulic pressure to the braking device 120 at a preset pressure. The braking force of the braking device 120 gradually decreases as the braking is released, and is maintained at a constant level when the preset pressure is reached. Thereafter, when the brake release is normally completed, the auxiliary hydraulic pressure is removed and the braking force is also removed.

The current of the motor 110 used to remove the braking force is required until the braking force reaches the preset pressure, and then the required amount is rapidly reduced as the auxiliary hydraulic pressure is applied. That is, the current and time required for the motor 110 used to remove the braking force are reduced.

In this case, since the amount of power is proportional to the current and the elapsed time, it will be understood that it is proportional to the area under the current-time elapsed line. In summary, the power consumption of the motor 110 for removing the braking force may be further reduced.

Figure 6:
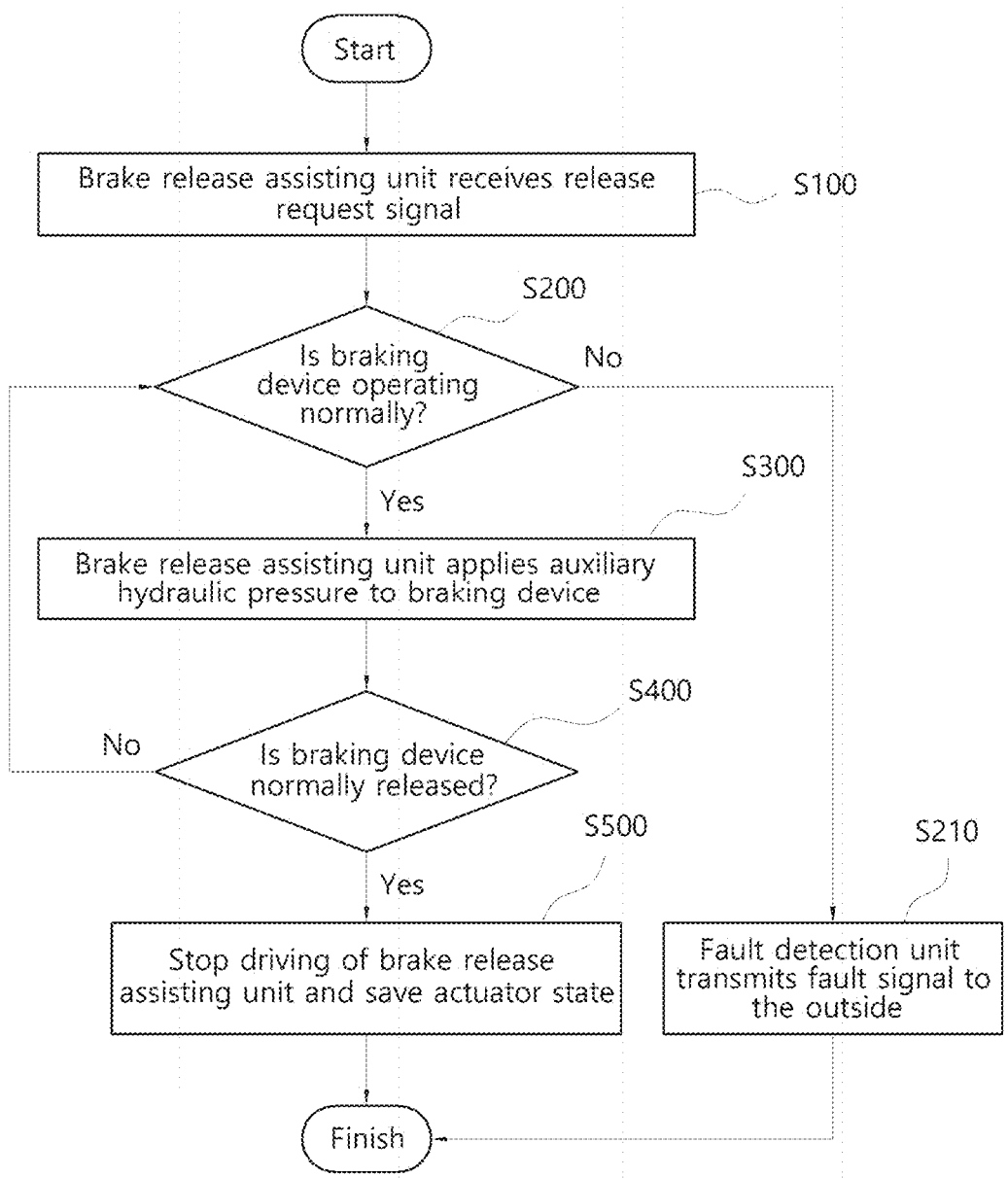
FIG. 6 is a flowchart illustrating the method for controlling a vehicle braking system according to an exemplary embodiment of the present disclosure.

Hereinafter, the method for controlling the vehicle braking system 1 according to an exemplary embodiment of the present disclosure will be described with reference to FIG. 6.

In the illustrated exemplary embodiment, the method for controlling the vehicle braking system 1 includes a step S100 of receiving a release request signal by a brake release assisting unit 50, a step S200 of determining whether a braking device 120 is operating normally, a step S300 of applying auxiliary hydraulic pressure to the braking device 120 by the brake release assisting unit 50, a step S400 of determining whether the braking device 120 is normally released and a step S500 of stopping the driving of the brake release assisting unit 50 and storing a state of an actuator 121.

First, the step S100 of receiving a release request signal by a brake release assisting unit 50 will be described.

In a state where the braking device 120 brakes the rotation of a wheel disk, the brake release control unit 320 transmits a release request signal to the brake release assist unit 50. When the release request receiving unit 510 of the brake release control unit 320 receives the signal, the brake release assist unit 50 determines whether to start the engine. In the above process, the step S200 of determining whether a braking device 120 is operating normally is performed.

The fault detection unit 40 determines whether the braking device 120 is operating normally. In an exemplary embodiment, when the voltage of the braking device 120 is less than a preset voltage, the fault detection unit 40 determines that the braking device 120 is operating abnormally.

When it is determined that the braking device 120 is operating abnormally, the step S210 of transmitting a fault signal to the outside by the fault detection unit 40 is performed. This is performed by the fault signal transmitting unit 420 of the fault detection unit 40. In an exemplary embodiment, the fault signal transmitting unit 420 may output at least one of a visual signal and an audio signal.

When it is determined that the braking device 120 is operating normally, the step S300 of applying auxiliary hydraulic pressure to the braking device 120 by the brake release assisting unit 50 is performed.

The hydraulic part 520 of the brake release assist unit 50 applies auxiliary hydraulic pressure to the braking device 120 at a preset pressure. Accordingly, the locking force of the braking device 120 may be maintained at a constant level.

Thereafter, the step S400 of determining whether the braking device 120 is normally released is performed. The above process is performed by the normal release determination unit 530 of the brake release assist unit 50.

The normal release determination unit 530 determines whether the brake release of the braking device 120 is normally completed. In an exemplary embodiment, the normal release determination unit 530 may determine that the brake release is normally completed when the current of the braking device 120 is less than a preset current, and at the same time, the load applied to the current of the braking device 120 is less than or equal to a preset value.

When it is determined that the brake release has not been completed, the subsequent steps from the step S200 of determining whether the braking device 120 normally operates are sequentially resumed.

When it is determined that the brake release is completed, the operation of the brake release assisting unit 50 is stopped, and the step S500 of storing a state of the actuator 121 is performed.

Although the above has been described with reference to preferred exemplary embodiments of the present disclosure, the present disclosure is not limited to the configuration of the above-described exemplary embodiments.

In addition, the present disclosure can be variously modified and changed by those skilled in the art to which the present disclosure pertains without departing from the spirit and scope of the present disclosure described in the claims below.

Furthermore, the above exemplary embodiments may be configured by selectively combining all or part of each exemplary embodiment so that various modifications can be made.

EXPLANATION OF REFERENCE NUMERALS

1: Vehicle braking system
10: Driving unit
110: Motor
120: Braking device
121: Actuator
122: Caliper unit
123: Carrier
20: Sensor unit
210: Ammeter
220: Voltmeter
30: Control unit
310: Braking device control unit
320: Brake release control unit
40: Fault detection unit
410: Data processing unit
420: Fault signal transmitting unit
50: Brake release assisting unit
510: Release request receiving unit
520: Hydraulic part
530: Normal release determination unit

The invention claimed is:

1. A vehicle braking system, comprising:
a hydraulic part configured to provide a preset hydraulic pressure to a braking device;
a brake release assisting unit comprising a processor and a memory, and configured to control the hydraulic part;
the braking device configured to control an actuator for braking and releasing a wheel cylinder, the releasing being performed after the preset hydraulic pressure is provided;
an ammeter configured to measure a current of the braking device; and
the processor configured to determine a condition in which both the current of the braking device is less than a preset current and a load applied to the current of the braking device is less than or equal to a preset value,
wherein the hydraulic part is further configured to terminate the application of the preset hydraulic pressure when the processor determines the condition.

2. The vehicle braking system of claim 1, wherein the brake release assisting unit stores a state at the time of termination of the actuator in the memory, the time corresponding to a time of termination of the hydraulic part.

3. The vehicle braking system of claim 1, further comprising:
a fault detection unit for determining whether the braking device is operating normally when braking of the braking device is released,
wherein the hydraulic part provides the preset hydraulic pressure when it is determined that the braking device is operating normally.

4. The vehicle braking system of claim 3, wherein the fault detection unit transmits a fault signal when it is determined that the braking device is operating abnormally.

5. The vehicle braking system of claim 4, wherein the fault detection unit outputs a visual signal, when a fault signal is transmitted.

6. The vehicle braking system of claim 4, wherein the fault detection unit outputs an auditory signal, when a fault signal is transmitted.

7. The vehicle braking system of claim 3, further comprising a voltmeter configured to measure a voltage of the braking device,
wherein the fault detection unit determines that the braking device is operating abnormally; when the voltage of the braking device is less than a preset voltage.

8. The vehicle braking system of claim 7, wherein the preset voltage is formed to be 10V.

9. A method for controlling a vehicle braking system, comprising:
providing, by a hydraulic part, a preset hydraulic pressure to a braking device;
releasing, by the braking device, a wheel cylinder after the preset hydraulic pressure is provided;
sensing, by an ammeter, a current of the braking device;
determining, by a brake release assisting unit comprising a processor and a memory, a condition in which both a current of the braking device is less than a preset current and a load applied to the current of the braking device is less than or equal to a preset value; and
terminating the application of the preset hydraulic pressure when the processor determines the condition.

10. The method of claim 9, further comprising determining whether the braking device is operating normally,
wherein the providing is performed when it is determined that the braking device is operating normally.

11. The method of claim 10, further comprising:
measuring, by a voltmeter, a voltage of the braking device;
determining the braking device is operating abnormally when the voltage is less than a preset voltage.

12. The method of claim 11, further comprising transmitting a fault signal.

13. The method of claim 12, wherein the fault signal comprises a visual signal.

14. The method of claim 12, wherein the fault signal comprises an auditory signal.

15. The method of claim 9, further comprising storing a state at the time of termination of the actuator in the memory, the time corresponding to a time of termination of the hydraulic part.

* * * * *